(12) United States Patent
Priem

(10) Patent No.: US 7,482,704 B2
(45) Date of Patent: Jan. 27, 2009

(54) AUTOMATIC GENERATOR STARTING PROTECTION

(75) Inventor: Dan G. Priem, Brooklyn Center, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 957 days.

(21) Appl. No.: 10/657,758

(22) Filed: Sep. 8, 2003

(65) Prior Publication Data
US 2005/0052027 A1 Mar. 10, 2005

(51) Int. Cl.
H02P 9/04 (2006.01)

(52) U.S. Cl. ........................................ 290/1 A; 290/1 R

(58) Field of Classification Search ................. 290/1 R, 290/2, 1 A; 322/17, 99; 123/479
See application file for complete search history.

(56) References Cited

U.S. PATENT DOCUMENTS

| | | | |
|---|---|---|---|
| 3,703,162 A | 11/1972 | Aono | |
| 4,182,960 A * | 1/1980 | Reuyl | 290/1 R |
| 4,551,980 A * | 11/1985 | Bronicki | 60/698 |
| 4,961,403 A * | 10/1990 | Kawaguchi et al. | 123/2 |
| 5,199,397 A | 4/1993 | Shelef et al. | |
| 5,276,624 A * | 1/1994 | Ito et al. | 701/72 |
| 5,333,703 A * | 8/1994 | James et al. | 180/271 |
| 5,336,932 A * | 8/1994 | Barske | 290/1 R |
| 5,432,413 A * | 7/1995 | Duke et al. | 318/139 |
| 5,576,739 A | 11/1996 | Murphy | |
| 5,583,413 A | 12/1996 | Proctor et al. | |
| 5,656,919 A | 8/1997 | Proctor | |
| 5,752,818 A | 5/1998 | Forster | |
| 5,838,243 A | 11/1998 | Gallo | |
| 5,844,326 A | 12/1998 | Proctor et al. | |
| 5,895,440 A | 4/1999 | Proctor et al. | |
| 5,939,855 A | 8/1999 | Proctor et al. | |
| 5,941,699 A | 8/1999 | Abele | |
| 5,954,040 A * | 9/1999 | Riedel | 123/703 |
| 5,973,481 A * | 10/1999 | Thompson et al. | 322/7 |
| 6,040,636 A | 3/2000 | DiCroce | |
| 6,392,312 B1 | 5/2002 | Morris | |
| 6,534,958 B1 * | 3/2003 | Graber et al. | 322/11 |
| 6,700,214 B2 * | 3/2004 | Ulinski et al. | 290/40 C |
| 2002/0096886 A1 | 7/2002 | Schmitz et al. | |
| 2003/0015875 A1 | 1/2003 | Fukaya | |
| 2004/0199297 A1 | 10/2004 | Schaper et al. | |

OTHER PUBLICATIONS

Schaper, S. R., et al., "Generator Controller", U.S. Appl. No. 60/449,927, filed Feb. 27, 2003, 27 pgs.

* cited by examiner

Primary Examiner—Julio Gonzalez
(74) Attorney, Agent, or Firm—Hamre, Schumann, Mueller & Larson, P.C.; J. Bruce Schelkopf

(57) ABSTRACT

This document discusses, among other things, systems, devices, and methods of disabling an automatic generator starting (AGS) actuator, such as used with a fuel-powered AC power generator providing AC electrical power to a recreational vehicle (RV) or other vehicle. The AGS actuator is disabled in response to a fault condition, such as may be indicative of a risk of hazardous gas, such as carbon monoxide (CO) accumulating near the vehicle, potentially in an enclosed area. After such disabling is performed, the vehicle driver would then have to consciously re-engage the AGS actuator. Factors useful for determining whether the fault condition exist include, among other things, transmission position, wheel rotation, vehicle engine operation status, ignition status, and/or an exhaust gas sensor.

34 Claims, 2 Drawing Sheets

AUTOMATIC GENERATOR STARTING PROTECTION

TECHNICAL FIELD

This document relates generally to electrical power generators and generator sets, and particularly by way of limitation, to automatic generator starting protection.

BACKGROUND

A fuel-powered AC electrical power generator, which also referred to as a generator set ("genset"), is used to generate electrical power from a fuel source. Examples include, among other things, gasoline-powered and other spark-ignited generators, and diesel-powered generators. Such generators have numerous applications including, among other things, providing electrical power in recreational vehicles ("RVs"), which are typically used for traveling, camping, etc.

RVs typically include electrical appliances (e.g., refrigerators, air conditioners, television sets, etc.). These electrical appliances are powered either (1) from "shore power," e.g., an AC plug-in at a campground; (2) from a DC battery from which AC power is generated using a DC-to-AC inverter; and/or (3) from a fuel-powered AC electrical power generator.

Some generators used in RVs include an automatic generator starting (AGS) system. The AGS system automatically turns on the AC generator, such as when shore power is unavailable or insufficient, or when the DC battery is depleted.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description, reference is made to the accompanying drawings which form a part hereof, and in which is shown by way of illustration specific embodiments in which the invention may be practiced. These embodiments, which are also referred to herein as "examples," are described in sufficient detail to enable those skilled in the art to practice the invention, and it is to be understood that the embodiments may be combined, or that other embodiments may be utilized and that structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a "nonexclusive or," unless otherwise indicated. Furthermore, all publications, patents, and patent documents referred to in this document are incorporated by reference herein in their entirety, as though individually incorporated by reference. In the event of inconsistent usages between this documents and those documents so incorporated by reference, the usage in the incorporated reference(s) should be considered supplementary to that of this document; for irreconcilable inconsistencies, the usage in this document controls.

Figure 1:
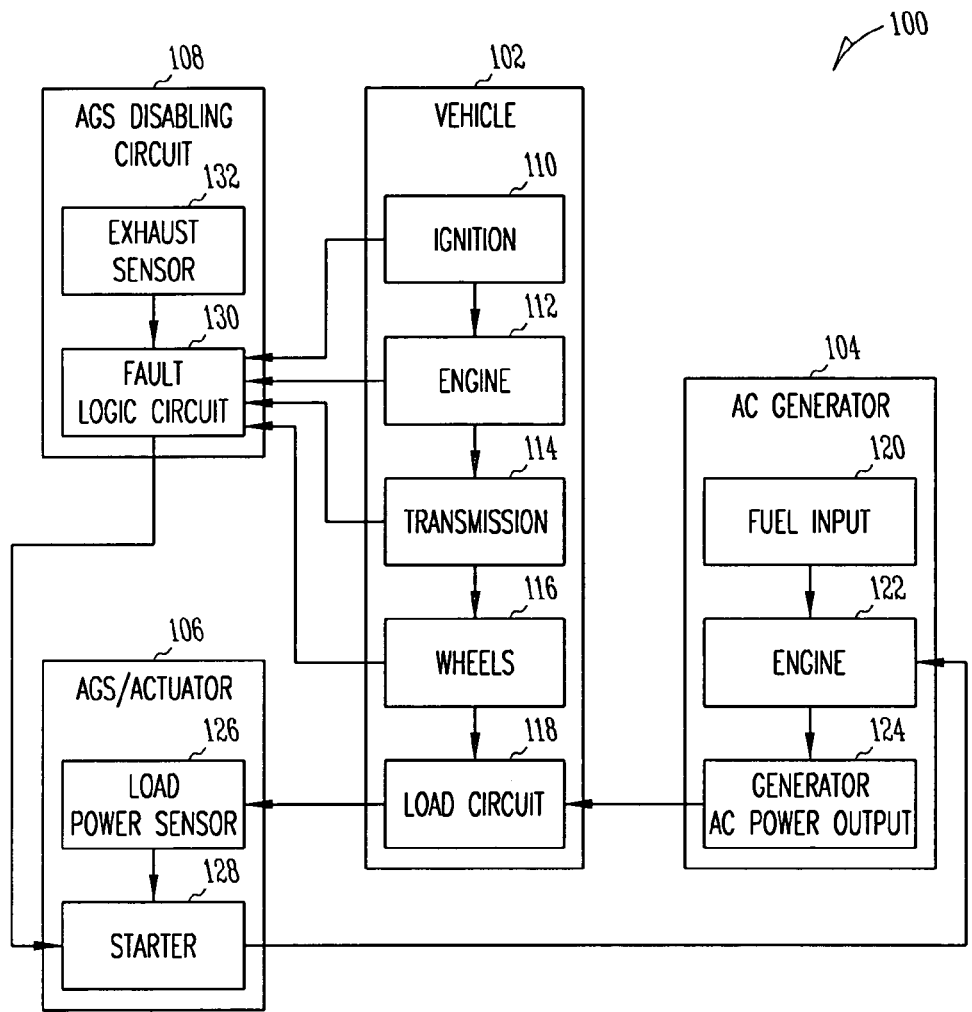
FIG. 1 is a conceptualized schematic diagram illustrating generally one example of a system including an automatic generator starting actuator and a disabling mechanism for the same.

FIG. 1 is a conceptualized schematic diagram illustrating generally, by way of example, but not by way of limitation, one example of a system 100. In this example, the system 100 includes a recreational vehicle (RV) or other vehicle 102, a fuel-powered AC generator 104, an automatic generator starting (AGS) actuator circuit 106, and an AGS disabling circuit 108. These constituents of the system 100 are illustrated separately for conceptual clarity, however, it is understood that such constituents, or portions thereof, may be integrated together.

In this example, the vehicle 102 includes a keyed or other ignition system 110 for controlling a combustion or other vehicle engine 112. The vehicle engine 112 is coupled to a drive/transmission system 114 for turning wheels 116 to move the vehicle 102. The vehicle 102 includes a load circuit 118. The load circuit 118 may include one or more onboard or other electrical appliances. The AC generator 104 is coupled to the vehicle load circuit 118 to provide it with AC electrical power, when needed. In this example, the AC generator 104 includes a fuel input 120 for a gasoline, diesel, or other combustion engine 122 for providing mechanical energy from which electrical energy is generated. The AC generator 104 includes an AC generator power output 124, which is coupled to the vehicle load circuit 118.

In this example, the AGS actuator 106 includes a load power sensor circuit 126. The load power sensor circuit 126 includes at least one input coupled to the vehicle load circuit 118 to detect when the vehicle load circuit 118 needs AC electrical power from the AC generator 104 (either alone, or supplementary to AC power being received from any vehicle engine 112 driven AC generator and/or any DC-to-AC power inverter included in the vehicle 102 and/or shore power). The load power sensor 126 includes an output providing a control signal to activate a starter 128. The starter 128 includes an electrical and/or mechanical output coupled to the generator engine 122 for starting it when AC electrical power is needed from the AC generator 104 by the load circuit 118.

In this example, the AGS disabling circuit 108 includes a fault logic circuit 130. The fault logic circuit 130 has an output that is coupled to the AGS actuator 106 to disable it when a fault condition indicates a risk of an exhaust hazard. One example of an exhaust hazard includes a high concentration of carbon monoxide (CO) in the ambient air about the vehicle 102. The high concentration of CO can result from CO in the exhaust stream of the vehicle engine 112 or of the generator engine 122. In one example, the fault logic circuit 130 includes input(s) for determining the fault condition from one or more of a CO or other exhaust sensor 132, the vehicle ignition 110, the vehicle engine 112, the vehicle drive train or transmission 114, and/or the vehicle wheels 116, and/or any other indication correlative to the fault condition, such as when the vehicle is within an enclosed or confined space. In addition to an exhaust hazard from a spark-ignited generator operating within an enclosed or confined space, a diesel generator operating within such a space also presents an inconvenience that could be regarded as an exhaust hazard.

Figure 2:
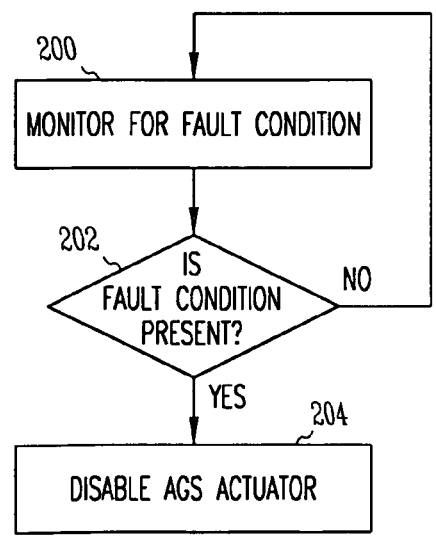
FIG. 2 is a flow chart illustrating generally one example of a method associated with the system of FIG. 1.

FIG. 2 is a flow chart illustrating generally, by way of example, but not by way of limitation, one example of a method associated with the system 100 of FIG. 1. At 200, a fault condition is monitored, as discussed below. At 202, if the fault condition is present, the AGS actuator 106 is disabled, at 204, to prevent an ambient CO hazard to humans or animals in or near the vehicle 102 and/or the AC generator 104. Otherwise, process flow returns to 200 to continue to monitor for the fault condition.

Examples of Fault Logic Circuit Inputs

Figure 3:
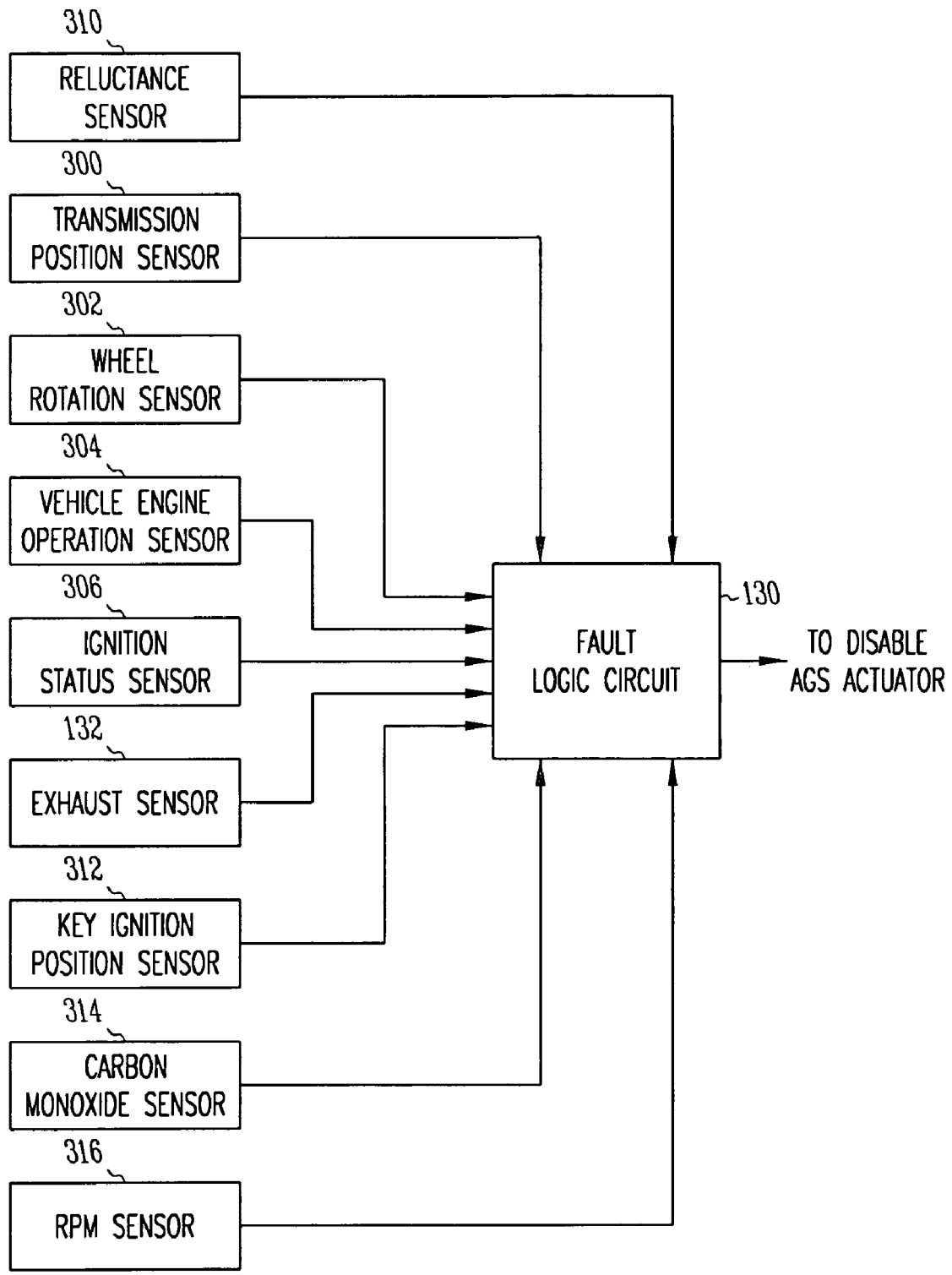
FIG. 3 is a block diagram illustrating generally one example of how a fault logic circuit determines whether the CO or other exhaust hazard condition exists, such as by using one or more factors as inputs.

FIG. 3 is a block diagram illustrating generally, by way of example, but not by way of limitation, one example of how the fault logic circuit 130 determines whether the CO or other exhaust hazard condition exists, such as by using one or more factors as inputs, examples of which are discussed below.

1. Transmission Position Sensor 300. In one example, the AGS actuator 106 is disabled when the vehicle transmission is switched from a "drive" gear position to a "park" gear position. After such disabling, the user would then have to consciously manually re-enable the AGS actuator, e.g., using a switch, to again permit automatic starting of the AC generator 104 in response to a need for AC power from the AC generator 104 by the load circuit 118. In one example, the transmission gear position is detected by the fault logic circuit 130 using transmission position status information received from an SAE J1850, an SAE J1939, another data link to the transmission 114, or a discrete electrical signal.

2. Wheel Rotation Sensor 302. In one example, the AGS actuator 106 is disabled when vehicle wheel rotation indicates that the vehicle 102 has transitioned from moving to stopped. The user would then have to manually re-enable the AGS actuator 106, as discussed above. In one example, the fault logic circuit 130 includes a timer circuit causing a wait for a predetermined time period after the vehicle 102 stops before disabling the AGS actuator 106. This prevents unnecessarily disabling the AGS actuator 106, such as during normal driving stops in vehicle traffic. In one example, wheel rotation information is communicated to the fault logic circuit 130 using a reluctance sensor coupled to at least one of the wheels 116 of the vehicle 102. In another example, wheel rotation information is communicated to the fault logic circuit 130 using an SAE J1850, an SAE J1939, or another data link providing vehicle speed information.

3. Vehicle Engine Operation Sensor 304. In one example, the AGS actuator 106 is disabled when the vehicle engine 112 is turned from "on" to "off." The user would then have to manually re-enable the AGS actuator 106, as discussed above. In one example, such vehicle engine operation status is obtained by monitoring vehicle engine revolutions per minute (rpm), or by monitoring the voltage to various vehicle engine components (e.g., fuel pump, etc.) where such voltage is indicative of whether the vehicle engine is running. In another example, such vehicle engine operation status is obtained from an SAEJ1850, an SAE J1939, or other data link broadcasting rpm information.

4. Ignition Status Sensor 306. In one example, the AGS actuator 106 is disabled when the vehicle ignition key is turned from the "on" position to the "off" position. The user would then have to manually re-enable the AGS actuator 106, as discussed above. In one example, ignition key position is sensed by monitoring the voltage to the ignition 110. In another example, such ignition status information is obtained from an SAEJ1850, an SAE J1939, or other data link broadcasting such information.

5. Exhaust sensor 132. In one example, the AGS actuator 106 is disabled when the exhaust sensor 132 indicates that a dangerous amount of hazardous gas is present in the ambient air about the vehicle 102. The user would then have to manually re-enable the AGS actuator 106, as discussed above. In one example, the exhaust sensor 132 detects ambient CO concentration. The fault logic circuit 130 compares the ambient CO concentration to a predetermined threshold value. If the ambient CO concentration exceeds the predetermined threshold value, then the fault logic circuit 130 disables the AGS actuator circuit 106.

6. Combinations. In one example, a combination of two or more of the above fault logic circuit 130 inputs are used to disable the AGS actuator 106. The user would then have to manually re-enable the AGS actuator 106, as discussed above.

Other Sensors

FIG. 3 also illustrates several other sensors including a reluctance sensor 310, a key ignition position sensor 312, a carbon monoxide sensor 314 and an RPM sensor 316. Each of the sensors, namely the reluctance sensor 310, the key ignition position sensor 312, the carbon monoxide sensor 314 and the RPM sensor 316 provides an input to the fault logic circuit 130.

Other Uses

Although the above examples have been discussed to particularly emphasize use with RVs or other vehicles (including boats), certain aspects are also applicable to automatically started fuel-powered engine generators in applications not involving vehicles.

CONCLUSION

It is to be understood that the above description is intended to be illustrative, and not restrictive. For example, aspects of the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

What is claimed is:

1. A system comprising:
    an actuator circuit, to automatically start a fuel-powered AC generator when a load circuit needs AC electrical power from the AC generator;
    a sensor circuit, to detect a fault condition indicative of a risk of an exhaust hazard; and a logic circuit, coupled to the sensor and actuator circuits, to disable the actuator circuit when the fault condition indicates that the risk of the exhaust hazard is present;
    wherein the load circuit includes an at least partially AC-powered electrical appliance of a vehicle.

2. The system of claim 1, in which the actuator circuit includes an automatic generator starting circuit, in which the automatic generator starting circuit includes a load power sensor to indicate when the load circuit needs AC electrical power from the AC generator.

3. The system of claim 1, in which the AC generator includes a spark-ignited generator.

4. The system of claim 1, in which the AC generator includes a diesel generator.

5. The system of claim 1, in which the load circuit includes an at least partially AC-powered electrical appliance of a recreational vehicle.

6. The system of claim 1, in which the sensor circuit includes a vehicle transmission position detector circuit to inhibit the automatically starting the fuel-powered AC generator.

7. The system of claim 1, in which the sensor circuit includes a data link to provide data used to inhibit the automatically starting the fuel-powered AC generator.

8. The system of claim 1, in which the sensor circuit includes a wheel rotation detector circuit to inhibit the automatically starting the fuel-powered AC generator.

9. The system of claim 1, in which the sensor circuit includes a reluctance sensor to inhibit the automatically starting the fuel-powered AC generator.

10. The system of claim 1, in which the sensor circuit includes a vehicle engine operation sensor to inhibit the automatically starting the fuel-powered AC generator.

11. The system of claim 1, in which the sensor circuit includes a vehicle engine rpm sensor to inhibit the automatically starting the fuel-powered AC generator.

12. The system of claim 1, in which the sensor circuit includes a vehicle engine ignition key position sensor to inhibit the automatically starting the fuel-powered AC generator.

13. The system of claim 1, in which the sensor circuit includes an exhaust sensor to inhibit the automatically starting the fuel-powered AC generator.

14. The system of claim 1, in which the sensor circuit includes a carbon monoxide sensor to inhibit the automatically starting the fuel-powered AC generator.

15. The system of claim 1, further including the AC generator.

16. The system of claim 15, further including a vehicle coupled to the AC generator.

17. The system of claim 15, further including a recreational vehicle coupled to the AC generator.

18. The system of claim 15, further including an electrical appliance coupled to the AC generator.

19. A method comprising:
   detecting a fault condition indicative of a risk of an exhaust hazard; and
   disabling an automatic AC generator starting actuator of a fuel-powered electrical AC generator, which starts when a load circuit is in need of AC electrical from the AC generator and where the load circuit includes an at least partially AC-powered electrical appliance of a vehicle, when the fault condition indicates that the risk of the exhaust hazard is present.

20. The method of claim 19, in which the detecting the fault condition includes detecting a vehicle transmission position to inhibit the automatically starting the fuel-powered AC generator when the fault condition indicates that the risk of an exhaust hazard is present.

21. The method of claim 20, in which the detecting the vehicle transmission position includes receiving data over a data link.

22. The method of claim 19, in which the detecting the fault condition includes detecting a wheel rotation to inhibit the automatically starting the fuel-powered AC generator when the fault condition indicates that the risk of an exhaust hazard is present.

23. The method of claim 22, in which the detecting the wheel rotation includes sensing a reluctance to inhibit the automatically starting the fuel-powered AC generator when the fault condition indicates that the risk of an exhaust hazard is present.

24. The method of claim 22, in which the detecting the wheel rotation includes receiving data over a data link to inhibit the automatically starting the fuel-powered AC generator when the fault condition indicates that the risk of an exhaust hazard is present.

25. The method of claim 19, in which the detecting the fault condition includes detecting a change in vehicular motion from moving to stopped to inhibit the automatically starting the fuel-powered AC generator when the fault condition indicates that the risk of an exhaust hazard is present.

26. The method of claim 19, in which the detecting the fault condition includes detecting a change in vehicular engine operation from engine running to engine off to inhibit the automatically starting the fuel-powered AC generator when the fault condition indicates that the risk of an exhaust hazard is present.

27. The method of claim 19, in which the detecting the fault condition includes detecting a change in vehicular ignition state to inhibit the automatically starting the fuel-powered AC generator when the fault condition indicates that the risk of an exhaust hazard is present.

28. The method of claim 27, in which the detecting the change in the vehicular ignition state includes detecting a change from ignition on to ignition off.

29. The method of claim 27, in which the detecting the change in the vehicular ignition state includes monitoring a voltage to at least one vehicular engine component.

30. The method of claim 27, in which the detecting the change in the vehicular ignition state includes receiving data over a data link.

31. The method of claim 19, in which the detecting the fault condition includes detecting at least one component of exhaust to inhibit the automatically starting the fuel-powered AC generator when the fault condition indicates that the risk of an exhaust hazard is present.

32. The method of claim 31, in which the detecting the at least one component of exhaust includes detecting carbon monoxide.

33. The method of claim 32, further comprising comparing the detected carbon monoxide to a predetermined threshold value.

34. A system comprising:
   a recreational vehicle, including a fuel-powered AC generator;
   an actuator circuit, to automatically start the fuel-powered AC generator when a load circuit of the recreational vehicle needs AC electrical power from the AC generator;
   a sensor circuit, to detect a fault condition indicative of a risk of an exhaust hazard; and
   a logic circuit, coupled to the sensor and actuator circuits, to disable the actuator circuit when the fault condition indicates that the risk of the exhaust hazard is present;
   wherein the load circuit includes an at least partially AC-powered electrical appliance of the recreational vehicle.

* * * * *